United States Patent
Russ

(10) Patent No.: US 7,942,079 B2
(45) Date of Patent: May 17, 2011

(54) MULTI-SPEED GEARBOX FOR LOW SPOOL DRIVEN AUXILIARY COMPONENT

(75) Inventor: David Everett Russ, Rockford, IL (US)

(73) Assignee: Hamilton Sundstrand Corporation, Rockford, IL (US)

( * ) Notice: Subject to any disclaimer, the term of this patent is extended or adjusted under 35 U.S.C. 154(b) by 553 days.

(21) Appl. No.: 11/675,679

(22) Filed: Feb. 16, 2007

(65) Prior Publication Data

US 2008/0200299 A1    Aug. 21, 2008

(51) Int. Cl.
*F16H 37/06* (2006.01)
*F02G 6/00* (2006.01)
*F02G 1/00* (2006.01)
*F02G 3/00* (2006.01)

(52) U.S. Cl. ...... 74/664; 74/665 R; 74/665 F; 74/665 P; 60/39.163; 60/39.15

(58) Field of Classification Search .................. 475/329, 475/5, 8–10; 60/39.15, 792
See application file for complete search history.

(56) References Cited

U.S. PATENT DOCUMENTS

| | | | |
|---|---|---|---|
| 2,723,531 A | 11/1955 | Wosika et al. | |
| 3,100,378 A * | 8/1963 | Austin et al. | 60/791 |
| 3,290,963 A | 12/1966 | Oldfield et al. | |
| 3,662,975 A | 5/1972 | Driskill | |
| 3,965,673 A | 6/1976 | Friedrich | |
| 4,461,143 A * | 7/1984 | Shutt | 60/788 |
| 4,776,163 A * | 10/1988 | Brockmann | 60/792 |
| 4,864,812 A | 9/1989 | Rodgers et al. | |
| 4,912,921 A | 4/1990 | Rice et al. | |
| 5,101,798 A | 4/1992 | Tomsett | |
| 5,174,109 A | 12/1992 | Lampe | |
| 5,309,029 A | 5/1994 | Gregory et al. | |
| 5,343,778 A | 9/1994 | Romero et al. | |
| 5,408,821 A | 4/1995 | Romero et al. | |
| 5,694,765 A * | 12/1997 | Hield et al. | 60/39.163 |
| 6,931,856 B2 | 8/2005 | Belokon et al. | |
| 7,028,461 B2 | 4/2006 | Goi | |
| 7,296,767 B2 * | 11/2007 | Palcic et al. | 244/17.11 |
| 7,481,062 B2 * | 1/2009 | Gaines et al. | 60/792 |
| 7,552,582 B2 * | 6/2009 | Eick et al. | 60/39.163 |
| 7,690,185 B2 * | 4/2010 | Linet et al. | 60/39.163 |
| 2006/0010875 A1 | 1/2006 | Mahoney et al. | |
| 2006/0016196 A1 | 1/2006 | Epstein | |

FOREIGN PATENT DOCUMENTS

EP    1 619 370 A1    1/2006
EP    1 798 399 A1    6/2007

OTHER PUBLICATIONS

European Search Report for EP Appl. No. 08250504.1, Mar. 29, 2010.

* cited by examiner

*Primary Examiner* — Tisha D Lewis
(74) *Attorney, Agent, or Firm* — Carlson, Gaskey & Olds, P.C.

(57) ABSTRACT

A turbine engine power generation system includes a gearbox that receives rotational drive from a low spool through an input gear, in one example. The gearbox includes first and second clutches that are coupled to an input shaft of an auxiliary component, such as a generator. First and second output gears are driven at different rotational speeds by the input gear and respectively associated with the first and second clutches. An actuator selectively engages at least one of the first and second clutches to select between first and second rotational speeds in response to a command from a controller.

13 Claims, 2 Drawing Sheets

US 7,942,079 B2

MULTI-SPEED GEARBOX FOR LOW SPOOL DRIVEN AUXILIARY COMPONENT

BACKGROUND

This application relates to a speed gearbox for driving an auxiliary turbine engine component. More particularly, the application relates to a multi-speed gearbox driven by a turbine engine spool to drive an electrical generator, for example.

An increasing number of airplanes require significant electric power for operation. Typically, a generator is driven by a high pressure spool through a power takeoff shaft. Due to modern airplane engine efficiency requirements, the electric power demand is increasing beyond the power extraction potential of the engine high pressure spool. That is, the efficiency provided by the high pressure spool drops to an unacceptable level if the generator is to be driven to provide a needed amount of electric power.

Power extraction is available from the low pressure spool of the engine, but the speed range is significantly higher than the high pressure spool (for example, approximately 5:1 for the low pressure spool and 2.22:1 for the high pressure spool). As a result, generators must be specially designed for use with the faster low spool to achieve the desired electrical output from a low spool-driven generator. Airplane and engine manufacturers are looking for ways to extract electric power and other accessory power from the low pressure spool in a cost effective and efficient manner.

SUMMARY

A turbine engine power generation system includes a gearbox that receives rotational drive from a low spool through an input gear, in one example. The gearbox includes first and second clutches that are coupled to an input shaft of an auxiliary component, such as a generator. First and second output gears are driven at different rotational speeds by the input gear and respectively associated with the first and second clutches. An actuator selectively engages at least one of the first and second clutches to select between first and second rotational speeds in response to a command from a controller.

These and other features of the application can be best understood from the following specification and drawings, the following of which is a brief description.

DETAILED DESCRIPTION OF THE PREFERRED EMBODIMENT

Figure 1:
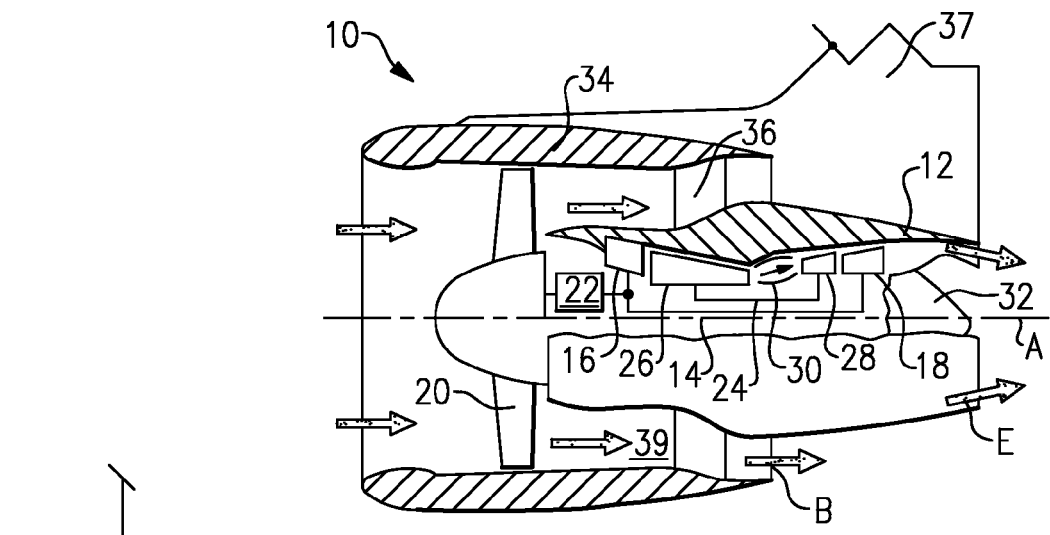
FIG. 1 is a cross-sectional view of one type of turbine engine.

A geared turbofan engine 10 is shown in FIG. 1. As known, a fan section moves air and rotates about an axis A. A compressor section, a combustion section, and a turbine section are also centered on the axis A. FIG. 1 is a highly schematic view, however, it does show the main components of the gas turbine engine. Further, while a particular type of gas turbine engine is illustrated in this figure, it should be understood that the claim scope extends to other types of gas turbine engines.

A pylon 37 supports the engine 10 on an aircraft. The engine 10 includes a core nacelle 12 that houses a low spool 14 and high spool 24 rotatable about an axis A. The low spool 14 supports a low pressure compressor 16 and low pressure turbine 18. In the example, the low spool 14 drives a fan 20 through a gear train 22. However, the fan 20 may be driven directly in some types of engines. The high spool 24 supports a high pressure compressor 26 and high pressure turbine 28. A combustor 30 is arranged between the high pressure compressor 26 and high pressure turbine 28. Compressed air from compressors 16, 26 mixes with fuel from the combustor 30 and is expanded in turbines 18, 28.

Airflow enters a fan nacelle 34, which surrounds the core nacelle 12 and fan 20. The fan 20 directs air into the core nacelle 12, which is used to drive the turbines 18, 28, as is known in the art. Turbine exhaust E exits the core nacelle 12 once it has been expanded in the turbines 18, 28, in a passage provided between the core nacelle and a tail cone 32.

The core nacelle 12 is supported within the fan nacelle 34 by structure 36, which are commonly referred to as upper and lower bifurcations. A generally annular bypass flow path 39 is arranged between the core and fan nacelles 12, 34. The bypass flow B within the bypass flow path 39 exits the aft of the fan nacelle 34.

Figure 2:
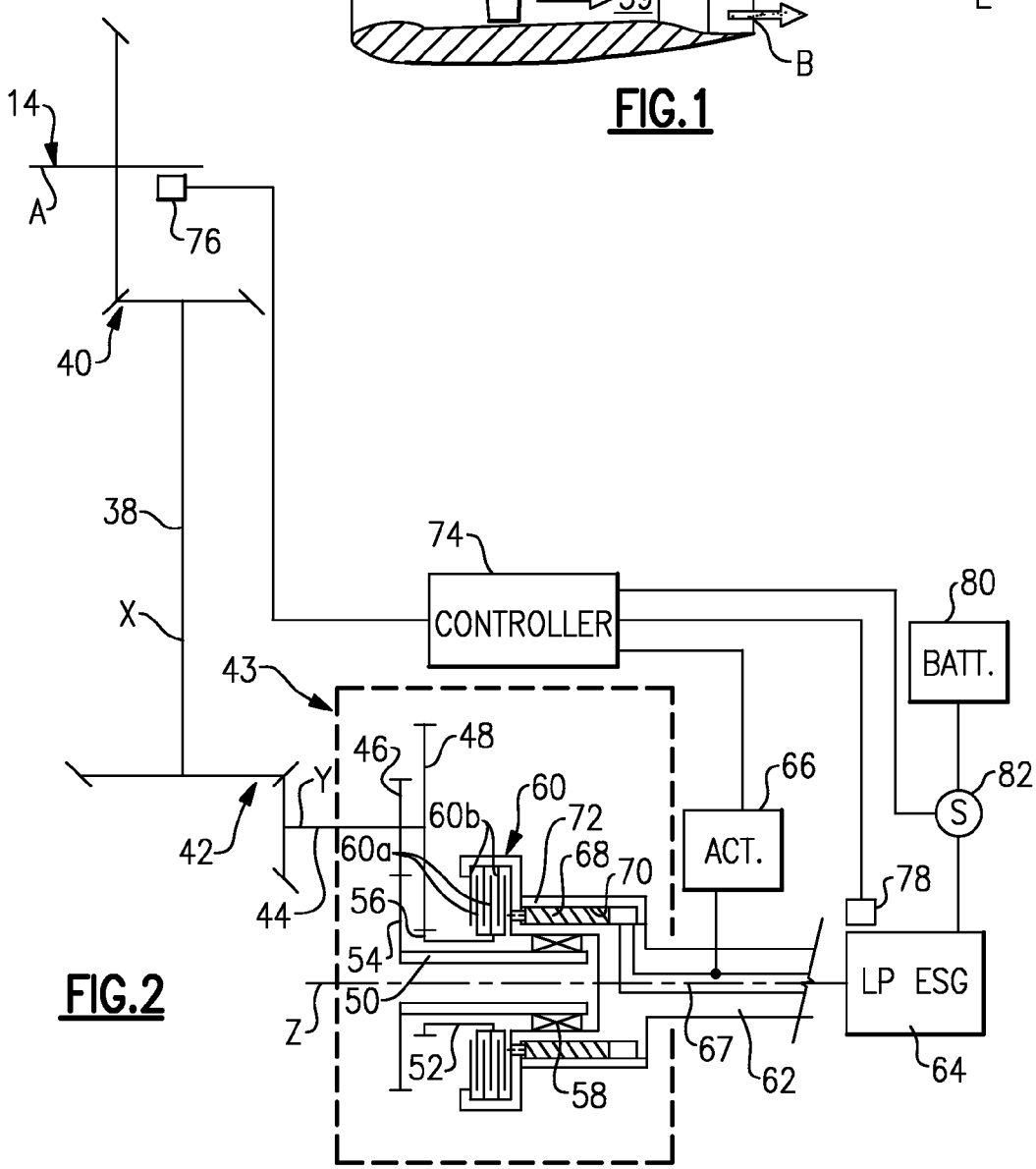
FIG. 2 is a schematic view of a turbine engine power generation system including an example gearbox.
Figure 4:
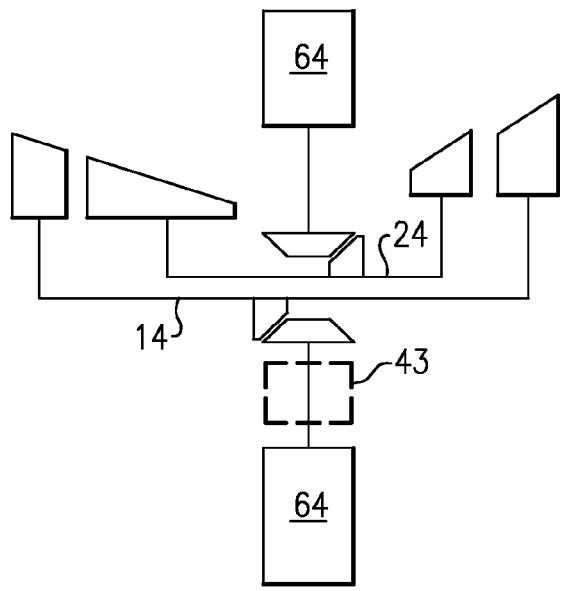
FIG. 4 is a more schematic view of the turbine shown in FIG. 1 with the low and high spools each driving a conventional generator typically used with high spools.

Referring to FIG. 2, a power takeoff shaft 38 is driven about an axis X by the low spool 14 through a first bevel gear set 40. A gearbox 43 changes the rotational speed provided by the low pressure spool for a generator 64 so that a conventional generator typically driven by the high spool 24 can be used, for example. In this manner, the same part number can be used with both the low and high pressure spools 14, 24 (see FIG. 4), for example.

The gearbox 43 includes an input shaft 44 rotatable about an axis Y receiving rotational drive from the power takeoff shaft 38 through a second bevel gear set 42. In the example shown in FIG. 2, first and second input gears 46, 48 are mounted coaxially on the input shaft 44. First and second output shafts 50, 52 are arranged concentrically relative to one another and rotate about an axis Z. The first output shaft 50 supports a first output gear 54 that is coupled with the first input gear 46. The second output shaft 52 supports a second output gear 56 that is coupled with the second input gear 48. The A, Y and Z axes are parallel to one another and perpendicular to the X axis in the example shown.

First and second clutches 58, 60 are respectively associated with the first and second output gears 50, 52. In one example, the first clutch 58 is an over-running clutch, which is known.

The first and second clutches 58, 60 are coupled to an auxiliary input shaft 62 that provides the rotational input to the generator 64. The second clutch 60 includes first discs 60a that are rotationally fixed relative to the auxiliary input shaft 62 and second discs 60b that are rotationally fixed relative to the second output shaft 52.

The auxiliary input shaft 62 includes a member 72 associated with it that includes a cavity 70. In one example, the first clutch 58 is arranged between the member 72 and the first output shaft 50. A piston 68 is arranged within the cavity 70. A passage 67 is in fluid communication with the piston 68. In one example, an actuator 66, which may be a hydraulic fluid supply, is in communication with the passage 67 to selectively apply fluid pressure to the piston 68.

A controller 74 is in communication with the actuator 66 and is programmed to command the actuator 66 to selectively engage the second clutch 60 to switch between first and second speeds. A low spool sensor 76 and generator sensor 78 are in communication with the controller 74, for example, to provide speed and other information, for example. The generator 64 provides electric power to a component or storage device, such a battery 80, when driven by the gearbox 43.

During operation of the engine 10 the low spool 14 rotates at a higher speed than the high spool 24. In order to use a conventional generator typically used with the high spool 24, the speed to the generator 64 is reduced at the higher rotational speeds of the low spool 14. At low spool speeds 14, the controller 74 commands the actuator 66 to pressurize the piston 68 thereby engaging the first and second discs 60a, 60b with one another to drive the generator 64 at higher rotational speeds. With the second clutch 60 engaged, the rotational input from the second input gear 48 is transmitted through the second output gear 56 to rotate the auxiliary input shaft 62, thus overrunning the first clutch 58.

During higher rotational speeds of the low spool 14, the first and second discs 60a, 60b of the second clutch 60 are disengaged to drive the generator 64 at lower rotational speeds. The rotational input from the first input gear 46, which rotates the first output gear 54, is transmitted to the auxiliary input shaft 62 through the first clutch 58.

The generator 64 can also be used as a starter. In one example, a switching device 82 is arranged between the battery 80 and the generator 64. The controller 74 commands the switching device 82 to supply power to the generator 64 from the battery 80. The energized generator 64 rotates the auxiliary input shaft 62 and drives the power takeoff shaft 38 through the gearbox 43 to rotate the low pressure spool 14. In one example, the controller 74 commands the actuator 66 to engage the second clutch 60 during the starting procedure.

Figure 3:
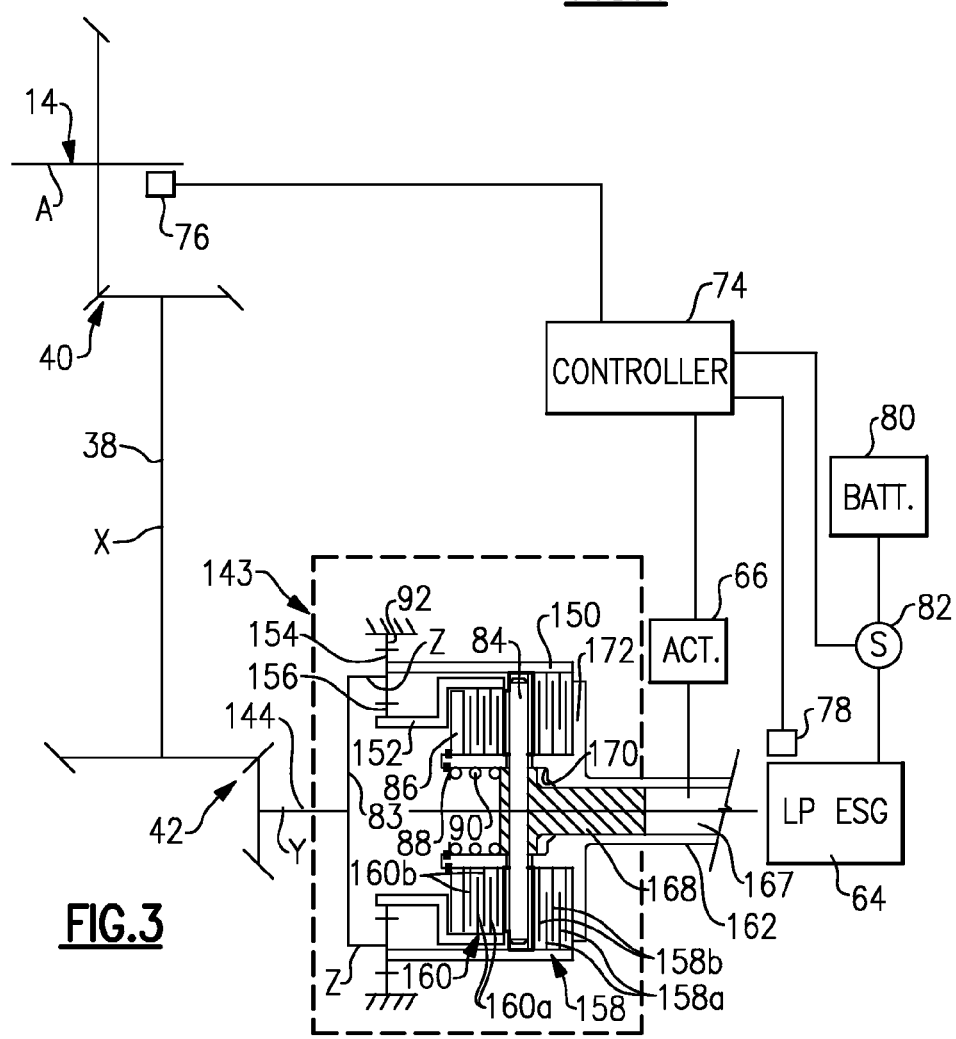
FIG. 3 is a schematic view of another turbine engine power generation system including another example gearbox.

Another example gearbox 143 is shown in FIG. 3. Like numerals are used in FIG. 3, which correspond to the numerals used in FIG. 2. In the example gearbox 143, a planetary gear arrangement is used to provide one of multiple speeds to the auxiliary input shaft 162. The input shaft 144 drives a carrier 83 that supports multiple circumferentially arranged planetary gears 154, which act as first output gears, each driven about an axis Z. The first output gears 154 are coupled to a ring gear 92 that acts as an input gear. The first output gears 154 are coupled to and rotationally drive a sun gear 156, which acts as a second output gear, about the axis Y. The first and second clutches 158, 160 are associated with the first and second output gears 154, 156.

First clutch discs 158a, 160a are supported by the member 172, and second clutch discs 158b, 16b are respectively supported by first and second output shafts 150, 152. A load plate 84 separates the first and second clutches 158, 160 to selectively engage at least one of the clutches 158, 160 in response to a pressurized input applied from the piston 168.

The member 172 includes a return spring 90 arranged between a retainer 88 and the load plate 84. The return spring 90 biases the load plate 84 along the axis Y so that the first clutch 158 is normally engaged in the absence of pressurization of the piston 168. Thus, the gearbox 143 is configured for high speed input to the generator 64 from the low spool 14 through the first clutch 158. This ensures that the generator 64 will not be driven at too high of a rotational speed.

When low speed rotation of the low spool 14 occurs, the controller 74 commands the actuator 66 to pressurize the passage 167, which causes the piston 168 to move along axis Y. The piston 168 overcomes the return spring 90 and forces the first and second discs 160a, 160b into engagement with one another and stop 86. The auxiliary output shaft 162 is driven at a higher rotational speed through the second clutch 160 when the low spool 14 is rotating at lower speeds.

The generator 64 can be used as a starter similar to the way described above relative to FIG. 2.

Although a preferred embodiment has been disclosed, a worker of ordinary skill in this art would recognize that certain modifications would come within the scope of the claims. For that reason, the following claims should be studied to determine their true scope and content.

What is claimed is:

1. A gearbox for driving an auxiliary turbine engine component comprising:
   an input shaft driving at least one input gear, the input shaft configured to receive rotational drive from a turbine engine;
   an auxiliary input shaft coupled to first and second clutches, the first and second clutches are configured to provide first and second rotational speeds to the auxiliary input shaft;
   an auxiliary component operatively coupled to the auxiliary input shaft;
   a first output gear coupling the at least one input gear and first clutch, and a second output gear coupling the at least one input gear and second clutch, the first and second output gears configured to be rotationally driven simultaneously by the input shaft;
   an actuator for selectively engaging the second clutch; and
   a controller programmed to command the actuator to engage the second clutch based upon which of the first and second rotational speeds corresponds to a desired rotational speed for the auxiliary component, wherein the first clutch is an overrunning clutch, the gearbox is configured such that the first clutch is rotationally overrun in response to engagement of the second clutch.

2. The gearbox according to claim 1, wherein the at least one input gear includes first and second coaxial input gears respectively coupled to the first and second output gears, the first and second output gears respectively supported on first and second output shafts that are concentric with one another.

3. The gearbox according to claim 1, comprising a piston, the piston engaging at least one of the first and second clutches in response to an input from the actuator.

4. The gearbox according to claim 1, wherein the second clutch includes first and second clutch discs respectively supported by a second output shaft and a member that is interconnected to the auxiliary input shaft, the first and second clutch discs engaging one another in response to an input from the actuator.

5. The gearbox according to claim 1, wherein the at least one input gear and first and second output gears are arranged in a planetary configuration, the at least one input gear provided by a ring gear, the first output gear provided by multiple planetary gears, and the second output gear provided by a sun gear arranged centrally relative to the multiple planetary gears.

6. The gearbox according to claim 1, wherein a load plate selectively engages the first and second clutches in response to an input from the actuator.

7. The gearbox according to claim 6, wherein a return spring biases the load plate to engage one of the first and second clutches, the actuator overcoming the return spring to engage the other of the first and second clutches in response to the command from the controller.

8. The gearbox according to claim 1, wherein the auxiliary component is a generator.

9. A turbine engine power system comprising:
   a turbine engine include high and low spools;
   a gearbox uncoupled relative to the high spool and coupled to the low spool and selectable between multiple speeds, the gearbox includes first and second clutches respectively providing first and second rotational speeds in response to a command from a controller;

an auxiliary component, wherein the auxiliary component is a generator and the generator is a starter configured to provide rotational input to the gearbox to rotationally drive the low spool during a starting procedure;

the generator configured to receive rotational drive from the low spool through the gearbox;

the controller programmed to command the gearbox between one of the multiple speeds for driving the generator at a desired rotational speed; and a single actuator receiving the command from the controller, the single actuator configured to engage at least one of the first and second clutches and select between the multiple speeds without a second clutch-engaging actuator.

10. The system according to claim 9, wherein the controller commands the gearbox during the starting procedure to engage one of the first and second clutches.

11. A method of providing rotational drive from a turbine engine to an auxiliary component comprising the steps of:

rotationally driving an auxiliary component at a first speed with a low spool without rotational input from a high spool, and transmitting rotation through a first clutch;

engaging a second clutch;

rotational driving the auxiliary component at a second speed different than the first speed with the second clutch, and overrunning the first clutch, wherein the second clutch is driven by the low spool; and wherein at least one of the first and second clutches is selectively engaged with an actuator.

12. The method according to claim 11, wherein the first rotationally driving step includes biasing a first clutch into engagement with a return spring, and the engaging step includes overcoming the turn spring with an actuator to engage a second clutch.

13. The gearbox according to claim 1, wherein the first and second clutches are configured to independently provide first and second rotational speeds to the auxiliary input shaft.

* * * * *